(12) United States Patent
Ban et al.

(10) Patent No.: US 6,428,915 B1
(45) Date of Patent: Aug. 6, 2002

(54) APPARATUS FOR REGULATING HUMIDITY OF PROCESS AIR IN FUEL CELL SYSTEM

(75) Inventors: Takashi Ban; Hirohisa Katoh; Masahiko Kimbara; Hidehito Kubo, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/404,088

(22) Filed: Sep. 23, 1999

(51) Int. Cl.7 .................................................. H01M 8/00
(52) U.S. Cl. .............................. 429/13; 429/12; 429/14; 429/17; 429/19; 429/22
(58) Field of Search .............................. 429/12, 13, 14, 429/17, 19, 22

(56) References Cited

U.S. PATENT DOCUMENTS

| | | | |
|---|---|---|---|
| 4,380,575 A | * | 4/1983 | Nakamura et al. ............. 429/13 |
| 5,366,818 A | * | 11/1994 | Wilkinson et al. ............. 429/13 |
| 5,645,950 A | * | 7/1997 | Benz et al. .................... 429/13 |
| 5,976,722 A | * | 11/1999 | Muller et al. .................. 429/13 |

FOREIGN PATENT DOCUMENTS

| | | |
|---|---|---|
| JP | 51-145005 | 12/1976 |
| JP | 58-129086 | 9/1983 |
| JP | 58-129087 | 9/1983 |
| JP | 7-14599 | 1/1995 |

* cited by examiner

*Primary Examiner*—Carol Chaney
*Assistant Examiner*—Dah-Wei D. Yuan
(74) *Attorney, Agent, or Firm*—Morgan & Finnegan, LLP

(57) ABSTRACT

A fuel cell system having a fuel cell, a gas compressor arranged to compress process air and connected to the fuel cell via an air-supply line to supply the compressed process air, a recovery unit connected to the fuel cell via an exhaust gas line, a liquid-gas separating unit arranged in the exhaust gas line to separate produced water from an exhaust gas and to store the separated produced water in a water storing vessel portion thereof, and a water-supply line extending from the bottom of the water storing vessel portion to a water-supply port provided for the gas compressor to supply the gas compressor with the produced water under the pressure of the exhaust gas applied to the produced water stored in the water storing vessel.

10 Claims, 2 Drawing Sheets

APPARATUS FOR REGULATING HUMIDITY OF PROCESS AIR IN FUEL CELL SYSTEM

BACKGROUND OF THE INVENTION

1. Field of the Invention

The present invention relates to a fuel cell system including a fuel cell and, more particularly, relates to a fuel cell system in which a water component contained in the gas exhausted from a fuel cell is utilized for humidifying the process air before air enters the fuel cell.

2. Description of the Related Art

Japanese Unexamined Patent Application (Kokai) No. 7-14599 (JP-A-'599) discloses a fuel cell system of which the basic construction and arrangement are shown in FIG. 2. In FIG. 2, process air is supplied via an air-supply line 3 to an air compressor 6 driven by a drive motor 30, and is compressed to a predetermined pressure. The compressed process air is supplied to a fuel cell 12. The fuel cell 12 uses the oxygen component in the process air and discharges the process air as an exhaust gas into a discharge line 5 in which an energy-recovery unit or an expander 16 is arranged to be connected to the air compressor 6 via a common shaft 20. The exhaust gas is expanded by the expander 16 and is discharged into the atmosphere.

Produced water contained in the exhaust gas exhausted from the fuel cell 12 is separated from the gas component by liquid-gas separators 18 and 24 respectively arranged in the discharge line 5. The produced water is subsequently collected into an open water tank 7 from which the water is pumped by a hydraulic pump 8 and is supplied to an injection nozzle 10 by which the water is injected into the process air to humidify the process air supplied into the fuel cell 12.

It will be understood from the foregoing description that, in the fuel cell system of JP-A-'599, the water component contained in the exhaust gas is separated by the liquid-gas separators 18, 24 to be collected into the water tank 7 from which the water is recycled to the air-supply line 3 to humidify the process air. Nevertheless, JP-A-'599 fails to disclose how to cool and lubricate the air compressor 6. Further, since the fuel cell system of JP-A-'599 must use the water pump 8 to deliver the water from the water tank 7 to the injection nozzle 10, it is difficult to employ this fuel cell system as a fuel cell system mounted on a vehicle from the viewpoint of easily mounting it in a mounting space in the vehicle. In addition, the employment of the water pump 8 will surely lead to an increase in the manufacturing cost of a fuel cell system.

SUMMARY OF THE INVENTION

An object of the present invention is to eliminate unfavorable problems encountered by the convention fuel cell system as disclosed in JP-A-'599.

Another object of the present invention is to provide a fuel cell system incorporating therein a fuel cell and able to humidify the process air supplied to the fuel cell and to cool and lubricate a gas compressor without a water pump to deliver the water.

In accordance with the present invention, there is provided a fuel cell system which comprises:

a fuel cell having at least an air inlet and an exhaust gas line;

a gas compressor connected to an air-supply line through which process air is supplied from the gas compressor into the fuel cell, the gas compressor having at least a compression chamber, a suction port, a delivery port and a water-supply port;

a recovery unit arranged in the exhaust gas line through which an exhaust gas containing therein produced water is discharged from the fuel cell;

a liquid-gas separating unit arranged in the exhaust gas line between the fuel cell and the recovery unit for separating the produced water from the exhaust gas, the liquid-gas separating unit having a water storing vessel for storing the produced water separated from the exhaust gas;

a water-supply line connecting between the water storing vessel of the liquid-gas separating unit and the water-supply port of the gas compressor; and a pressure-supply means for applying the pressure of the exhaust gas to the produced water stored in the water storing vessel to thereby deliver the produced water from the liquid-gas separating unit into the water-supply line.

Preferably, the gas compressor is provided with a suction port for the process air and at least one compression chamber which is supplied with a water via the water-supply port when the compression chamber is completely closed to confine therein the process air sucked from the suction port.

Preferably, a flow control valve is arranged in the water-supply line to regulate the flow rate of the water flowing through the water-supply line in response to detection of a predetermined signal indicating an operating condition of the gas compressor.

Further preferably, the predetermined signal indicating the operating condition of the gas compressor comprises a humidity signal indicating the humidity of the process air delivered from the gas compressor toward the fuel cell.

Preferably, the predetermined signal indicating the operating condition of the gas compressor comprises a flow signal indicating the flow rate of the process air delivered from the gas compressor toward the fuel cell.

The fuel cell system is preferably provided with a subsidiary water vessel fluidly connected to the liquid-gas separating unit for receiving excess water overflowing the liquid-gas separating vessel when the water stored in the liquid-gas separating unit exceeds a predetermined limiting level.

Since the pressure of the exhaust gas exhausted from the fuel cell is constantly applied to the surface of the water separated from the exhaust gas and stored by the liquid-gas separating unit, the water can be supplied into the water-supply port of the gas compressor via the water-supply line without the assistance of a liquid pump. Thus, the supplied water is able to perform cooling and lubricating of the gas compressor as well humidifying the process gas supplied to the fuel cell. At this stage, since the water-supply port of the gas compressor is arranged so that the water supplied into the compression chamber when the compression chamber is completely closed to confine therein the process air sucked from the suction port, there occurs neither leaking of the water from the gas compressor toward the exterior of the gas compressor, without it being delivered together with the compressed process air, nor a reverse-flow of the water from the compression chamber toward the water-supply port and the suction port. Namely, the water can be surely confined in the compression chamber together with the process air to humidify the air and it is subsequently discharged from the compression chamber while absorbing the compression heat. Thus, cooling of the gas compressor as well as lubrication of movable elements of the compressor such as a rotor, vanes, a movable scroll element and bearings can be achieved.

BRIEF DESCRIPTION OF THE DRAWINGS

The above and other objects, features and advantages of the present invention will be made more apparent from the ensuring description of a preferred embodiment of the present invention with reference to the accompanying drawings wherein.

DESCRIPTION OF THE PREFERRED EMBODIMENT

Figure 1:
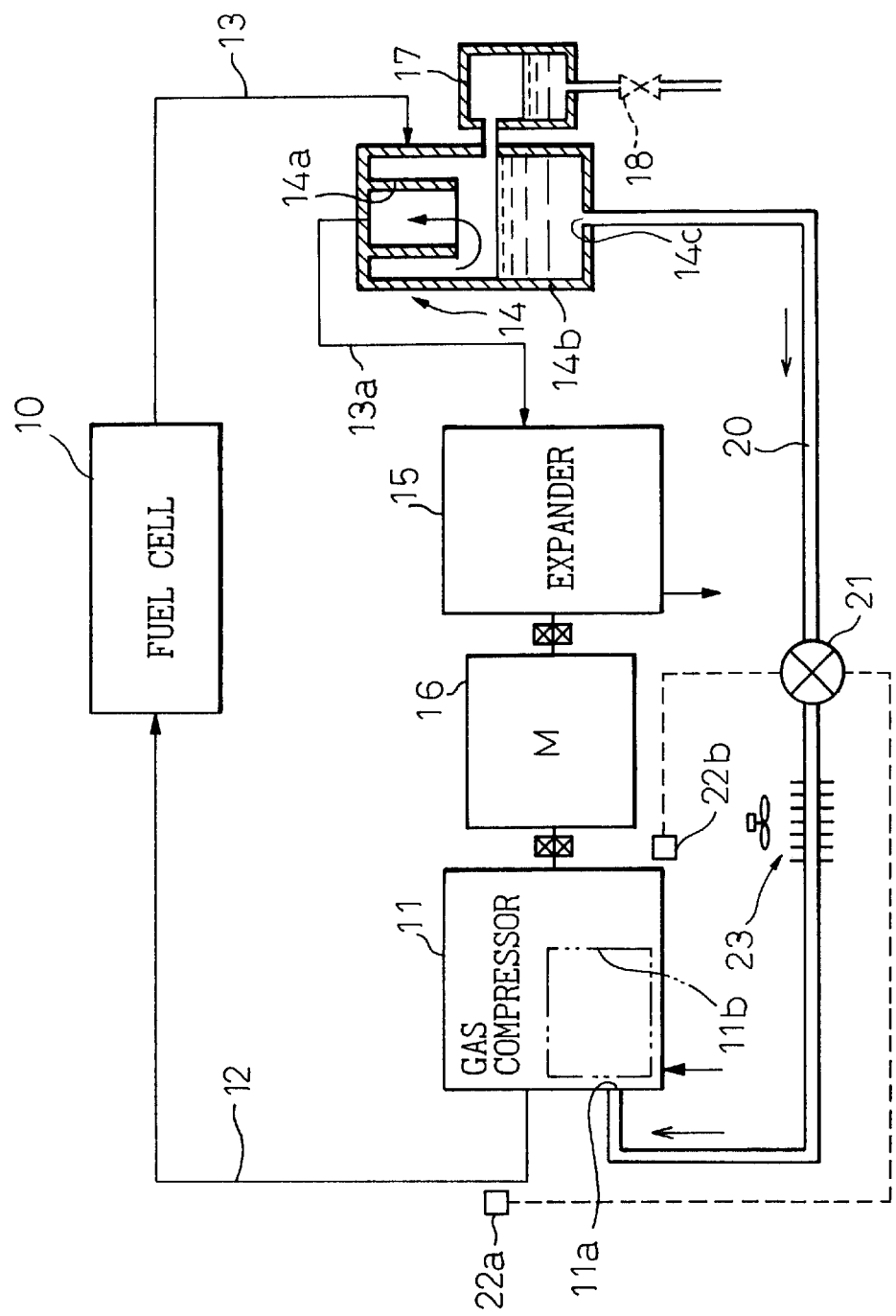
FIG. 1 is a general block diagram schematically illustrating an important portion of a fuel cell system according to the present invention.
Figure 2:
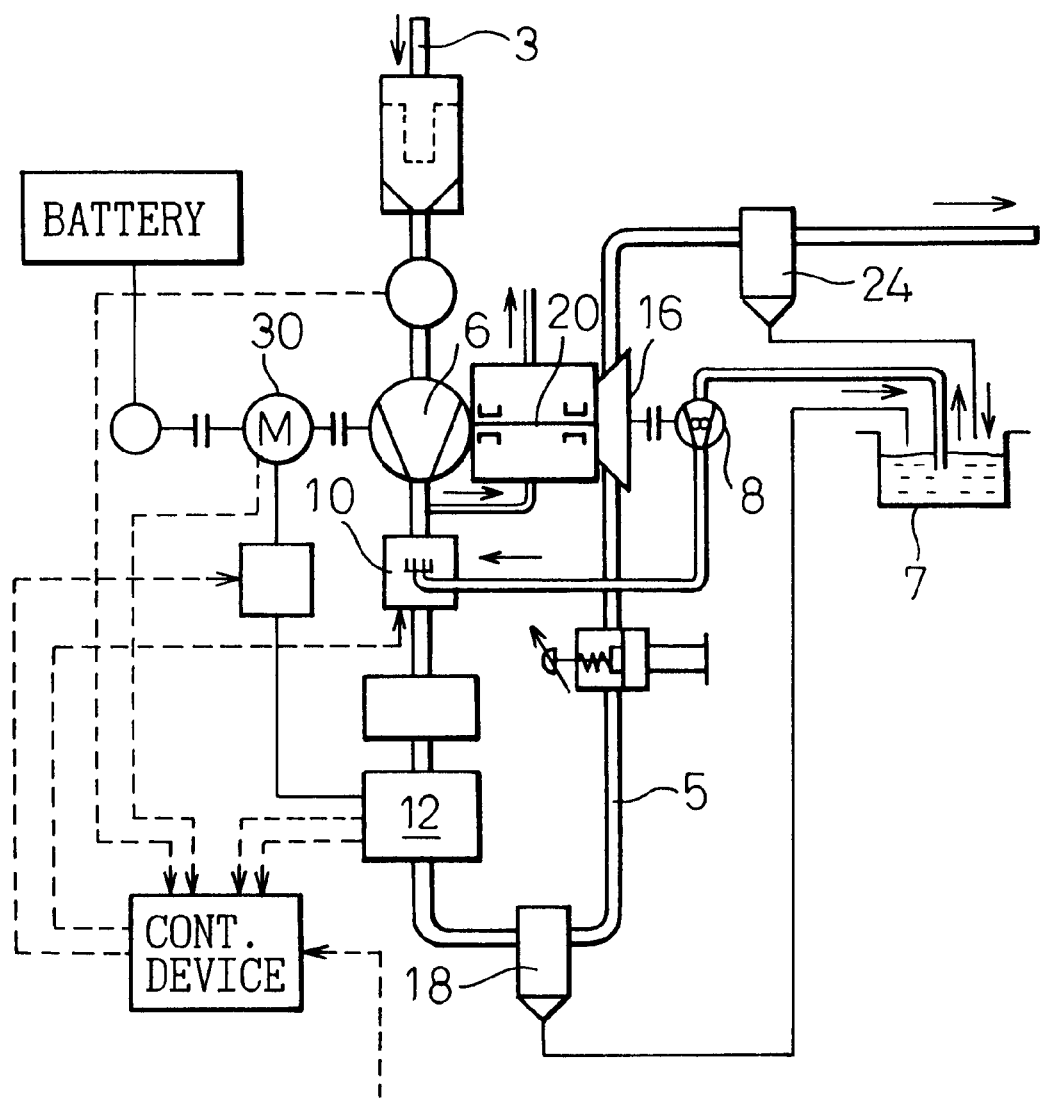
FIG. 2 is a block diagram illustrating a fuel cell system according to the prior art.

Referring to FIG. 1, a fuel cell system of the present invention includes a fuel cell 10 having a conventional internal assembly having a positive electrode (anode) and a negative electrode (cathode) arranged on opposite sides of a plate of electrolyte to form a layer construction. The fuel cell 10 is supplied with a process air delivered from a gas compressor 11 via an air-supply line 12. The process air passes through an anode cavity (not shown) of the fuel cell 10, and is discharged from the fuel cell 10 via an exhaust gas line 13 as an exhaust gas. A cathode cavity (not shown) of the fuel cell 10 is supplied with a fuel gas containing therein hydrogen or reformed hydrogen. The hydrogen and the oxygen contained in the process air implement chemical reaction to produce electric energy, produced water, and reaction heat. Thus, the exhaust gas discharged from the fuel cell 10 into the exhaust line 13 contains a large amount of water vapor. Thus, the unit 14 having a separator 14a and a water-storing vessel 14b, and the produced water contained in the exhaust gas is separated from the exhaust gas by the separator 14a. The separated water is stored in the water-storing vessel 14b of the liquid-gas-separating unit 14. The liquid-gas-separating unit 14 is formed as a closed cylindrical unit having an outer cylindrical wall and an upper wall. The separator 14a is formed as an inner cylindrical wall hanging from the upper wall within the liquid-gas-separating unit 14. The water-storing vessel 14b of the liquid-gas-separating unit 14 is arranged below the separator 14a and has a suitable cavity to receive and store the separated water. The exhaust line 13 is connected, at its extreme end, to an upper portion of the outer cylindrical wall of the liquid-gas separating unit 14, and an additional gas line 13a is connected, at its inner end, to the upper wall and, at its outer end, to a later-described recovery unit or an expander 15. The exhaust gas containing therein the vapor of the produced water and carried by the exhaust line 13 enters the liquid-gas separating unit 14 in which the exhaust gas circularly flows around the separator 14a so that the vapor of the produced water is physically separated from the gas component due to a centrifugal force. Thus, the separated water drops into the water-storing vessel 14b. The water removed gas component flows out of the top of the liquid-gas separating unit 14 into the additional gas line 13a which carries the gas component to the recovery unit (the expander) 15 in which the pressure energy of the gas component is recovered. The recovery unit 15 is arranged to be connected, via a common shaft, to a drive motor 16, which drives the gas compressor 11.

The water-storing vessel 14b of the liquid-gas separating unit 14 has a bottom wall having an water outlet 14c connected to a water-supply line 20. The water-supply line 20 extends from the water-storing vessel 14b to a water-supply port 11a provided for the gas compressor 11. It should be understood that the water-supply port 11a is arranged so as to supply water into a compression chamber 11b of the gas compressor 11 when the compression chamber is completely closed to confine air sucked from a suction port of the gas compressor. Thus, the water is evaporated with the compression chamber 11b during the compression of the process air and humidifies the compressed process air. The water-supply line 20 includes therein a solenoid type flow control valve 21, which is controlled by signals from sensors 22a and 22b. Namely, the flow rate of the water passing through the solenoid type flow control valve 21 is regulated by the signals of the sensors 22a and 22b. The sensors 22a and 22b are arranged so as to measure the humidity and the amount of the process air delivered from the gas compressor 11. It should be understood that the amount of delivery of the process air can be measured by measuring the number of rotations of the gas compressor 11.

The water stored in the water-storing vessel 14b of the liquid-gas separating unit 14 is firstly used for humidifying the process air in order to permit an ion exchange membrane to maintain a good conductivity for protons therethrough, and is secondly used for cooling, lubricating and enhancing the sealing of the gas compressor 11. Therefore, the utilization of the water of the liquid-gas-separating unit 14 can be very effective. Further, the surface of the water stored in the water-storing vessel 14b constantly receives the pressure of the exhaust gas coming from the exhaust line 13 during the operation of the exhaust gas coming from the exhaust line 13 during the operation of the fuel cell system, and accordingly, the water can be delivered by the pressure of the exhaust gas from the water-storing vessel 14b toward the water-supply port 11a of the gas compressor, via the water-supply line 20, without assistance of a water delivery source such as a liquid pump.

The liquid-gas separating unit 14 is preferably provided with a subsidiary water vessel 17 attached to the water-storing vessel 14b to receive an overflow of the water from the water-storing vessel 14b when a water level in the water-storing vessel 14b exceeds a predetermined limiting level. Further, the subsidiary water vessel 17 can be provided with a float switch (not shown) to detect a predetermined water level in the subsidiary water vessel 17. When the float switch detects that the water level in the subsidiary water vessel 17 is above the predetermined water level, a signal is provided by the float switch to a solenoid valve 18 to thereby drain the excess amount of water from the subsidiary water vessel.

The water-supply line 20 may be provided with a cooling device 23 such a cooling fan as required.

From the foregoing description of the fuel cell system of the present invention, it will be understood that the exhaust gas exhausted from the fuel cell 10 can be subjected to a liquid-gas separation within the liquid-gas separating unit 14 to remove the produced water contained in the exhaust gas. Further, the water removed exhaust gas is subsequently introduced into the recovery unit (the expander) 15 to recover the pressure energy of the exhaust gas as a corresponding amount of mechanical energy. The water component separated from the exhaust gas within the liquid-gas separating unit 14 can be delivered from the water-storing vessel 14b toward the gas compressor 11 via the water-supply line 20 by the utilization of the pressure of the exhaust gas entering the liquid-gas separating unit 14. Thus, the supplied water can perform humidifying of the process air and cooling and lubrication of the gas compressor 11. At this stage, the amount of the supply of the water from the water-supply line 20 to the water-supply port 11a of the gas compressor 11 can be regulated by the solenoid type flow control valve 21, so that an appropriate amount of the water is constantly supplied to the gas compressor depending on the operating condition of the gas compressor 11 per se. Further, since the water-supply port 11a of the gas compressor 11 is arranged to supply water to the compression chamber 11b when the compression chamber 11b is completely closed to confine therein the process air sucked from the suction port, not only leakage of the water into the exterior of the gas compressor 11 but also a reverse flow of the water from the gas compressor 11 to the water-supply line 20 can be surely prevented. Therefore, an effective use of the produced water which is separated from the exhaust gas and is delivered from the water-storing vessel 14b under the pressure of the exhaust gas can be surely guaranteed.

In the described embodiment, the water-storing vessel 14b and the separator 14a are formed as an integral cylindrical unit constituting the liquid-gas-separating unit 14. However, as required, the separator 14a having a liquid-gas separating function and the water-storing vessel 14b having a sufficient storing volume may be separate elements manufactured individually if the two elements are arranged to cooperate with one another to perform the necessary functions.

In accordance with the fuel cell system of the present invention, the produced water contained in the exhaust gas exhausted from the fuel cell is physically separated from the exhaust gas to be stored in the water-storing vessel. The stored water is delivered under the pressure of the exhaust gas from the water-storing vessel to the water-supply port of the gas compressor. Thus, the produced water can be recycled to humidify the process air to be supplied to the fuel cell and to cool and lubricate the gas compressor without using a pump means to deliver water. Thus, the fuel cell system of the present invention can be simpler in its construction and arrangement compared with the conventional fuel cell system, and can be easily mounted on a vehicle when it is used as a vehicle fuel battery. Further, since the supply of the produced water under pressure to the gas compressor is carried out in such a manner that the water enters the compression chamber when the latter is closed to confine therein the sucked process air, all of the water entering the compression chamber is effectively used to humidify the process air, to cool and lubricate the compressor and to seal the compression chamber without leaking toward the exterior of the gas compressor. Therefore, the operational reliability of the gas compressor can be very high.

Many changes and modifications will occur to a person skilled in the art without departing from the scope and spirit of the invention as claimed in the accompanying claims.

What is claimed is:

1. A fuel cell system comprising:
   a fuel cell having at least an air inlet and an exhaust gas line;
   a gas compressor connected to an air-supply line through which process air is supplied from said gas compressor into said fuel cell, said gas compressor having at least a compression chamber, a suction port, a delivery port and a water-supply port;
   a recovery unit arranged in said exhaust gas line through which an exhaust gas, containing therein produced water, is discharged from said fuel cell;
   a liquid-gas separating unit arranged in said exhaust gas line between said fuel cell and said recovery unit for separating said produced water from said exhaust gas, said liquid-gas separating unit having a water storing vessel for storing said produced water separated from said exhaust gas;
   a water-supply line connecting between said water storing vessel of said liquid-gas separating unit and said water-supply port of said gas compressor, wherein said produced water is delivered from said water storing vessel through said water supply line to said water supply port by applying the pressure of said exhaust gas to said produced water in said water storing vessel.

2. A fuel cell system according to claim 1, wherein said gas compressor is supplied with said produced water via said water-supply line and said water-supply port when said compression chamber is completely closed to confine therein said process air sucked from said suction port.

3. A fuel cell system according to claim 1, wherein a flow control valve is arranged in said water-supply line to regulate a flow rate of said produced water flowing through said water-supply line in response to a detection of a signal indicating an operating condition of the gas compressor.

4. A fuel cell system according to claim 3, wherein said signal indicating the operating condition of said gas compressor comprises a humidity signal indicating the humidity of the process air delivered from said gas compressor toward said fuel cell.

5. A fuel cell system according to claim 3, wherein said signal indicating the operating condition of said gas compressor comprises a flow signal indicating a flow rate of said process air delivered from said gas compressor toward said fuel cell.

6. A fuel cell system according to claim 3, wherein said water-supply line is provided with a cooling means to cool said produced water before it enters said gas compressor.

7. A fuel cell system according to claim 1, wherein said liquid-gas separating unit comprises a closed cylindrical unit having an outer cylindrical wall, an upper wall closing an upper end of said outer cylindrical wall, an inner cylindrical wall hanging from said upper wall within said closed cylindrical unit, said inner cylindrical wall member being formed as a water separator to separate said produced water from said exhaust gas entering said liquid-gas separating unit.

8. A fuel cell system according to claim 7, wherein said closed cylindrical unit is provided with a water receiving portion at a lower portion thereof to receive said produced water separated from said exhaust gas, said water receiving portion being said water storing vessel.

9. A fuel cell system according to claim 8, wherein said water storing vessel is disposed directly beneath said water separator so that pressure of said exhaust gas is applied to said produced water stored in said water storing vessel.

10. A fuel cell system according to claim 1, wherein said fuel cell system further comprises a subsidiary water vessel fluidly connected to said liquid-gas separating unit for receiving excess water overflowing said water storing vessel of said liquid-gas separating unit when said produced water stored in said water storing vessel of said liquid-gas separating unit exceeds a limiting level.

* * * * *

UNITED STATES PATENT AND TRADEMARK OFFICE
CERTIFICATE OF CORRECTION

PATENT NO.    : 6,428,915 B1
DATED         : August 6, 2002
INVENTOR(S)   : Ban et al.

It is certified that error appears in the above-identified patent and that said Letters Patent is hereby corrected as shown below:

<u>Title page,</u>
Insert Item [30] as follows
-- [30]           Foreign Application Priority Data
Sept. 25, 1998   (JP) …………....10-271933 --

<u>Column 3,</u>
Line 32, please delete "Thus, the unit 14" and insert therefor
-- Thus, the exhaust line 13 is connected to a liquid-gas separating unit 14 --.

Signed and Sealed this

Twenty-fourth Day of December, 2002

JAMES E. ROGAN
*Director of the United States Patent and Trademark Office*